Nov. 4, 1958 J. G. NEWALL ET AL 2,858,881
FABRICATED POLYURETHANE CUSHION
Filed April 26, 1956
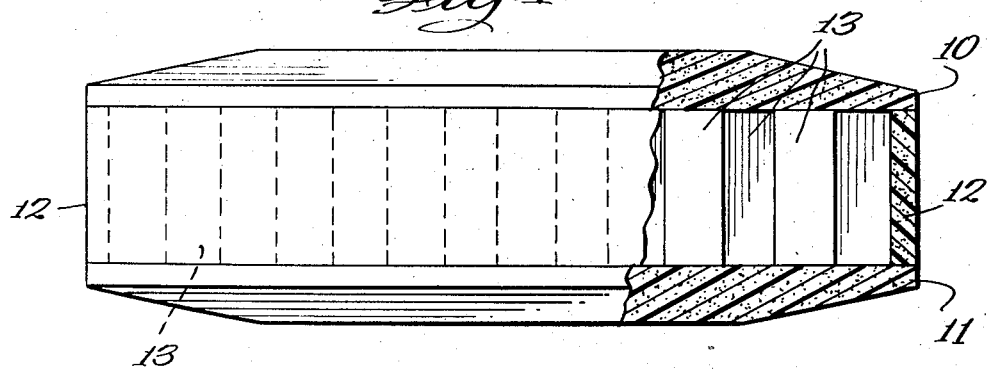
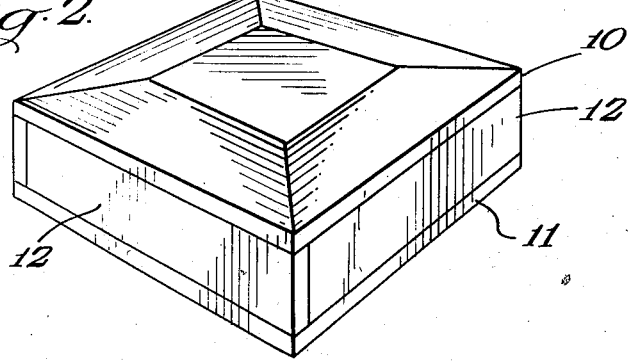
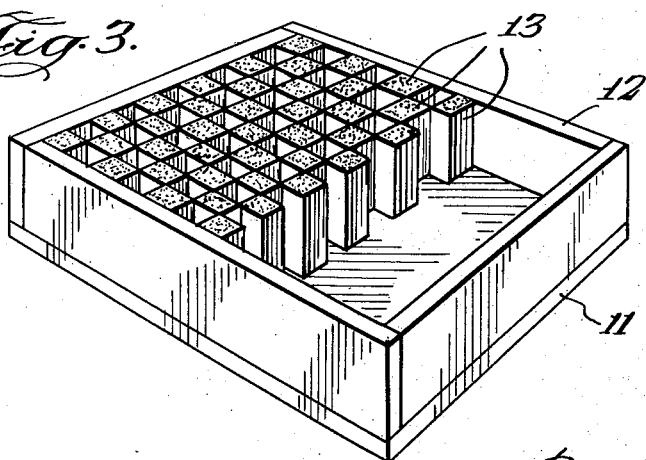
Inventors
John G. Newall
Vernon C. Sickle
By Carl C. Batz
Attorney

United States Patent Office 2,858,881
Patented Nov. 4, 1958

2,858,881

FABRICATED POLYURETHANE CUSHION

John G. Newall and Vernon C. Sickle, Alliance, Ohio, assignors to Armour and Company, Chicago, Ill., a corporation of Illinois Application April 26, 1956, Serial No. 580,793

4 Claims. (Cl. 155—179)

This invention relates to a fabricated resilient polyurethane cushion. In its preferred aspect, this invention relates to a fabricated cushion made of resilient polyurethane foam material which is particularly suitable for use in chairs, sofas, and the like.

Foamed rubber cushions and mattresses are well-known and have enjoyed considerable commercial acceptance. Foamed rubber, because of its chemical formulation, is readily adaptable into fabricating cushions, mattresses and the like by a molding process, and this is by far the most common method for producing cushions. However, one of the most serious criticisms of foamed rubber cushions is the premium price they command. Recently, there has become available commercially resilient polyurethane foams which, from a price standpoint, have been exceptionally competitive with foamed rubber. One particular characteristic which has made it more desirable than foamed rubber is its self-curing properties; that is to say, once the foam is formed it does not have to be cured in an oven as does foamed rubber.

The price, durability, and the self-curing characteristic of resilient polyurethane foam has made their use in cushions extremely desirable. However, to the best of our knowledge, no one has ever succeeded in molding a polyurethane foam cushion which would be acceptable to the furniture trade. In the first place, polyurethane foam, although resilient, is not as soft to the touch as foamed rubber. It has a firmness noticeably different from that of foamed rubber. Secondly, when molding of the polyurethane foam is attempted, the portions between the core holes in the mold seem to have a hardness and high density which makes the resulting cushion much too firm to be acceptable. The reason for this firmness is not completely understood but it is believed, in part at least, to be due to a skinning effect which seems to be inherent in polyurethane foams. Another factor may be the manner in which it is necessary that the foam be formed; that is, the foam must form in the mold from a viscous resin, and the limited space into which the foam can expand has a tendency to confine the resulting foam in a more dense condition than if the already foamed product was merely shaped in a mold. This latter procedure is not possible with polyurethane foams because once the foam is formed it sets quickly and there is insufficient time to shape it in a mold.

In accordance with the present invention, we have provided a fabricated resilient polyurethane foam cushion which is very simple to make, is extremely durable, and which results in very little scrap loss. Our cushion is fabricated completely of resilient polyurethane foam and comprises, generally, a bottom and top of thin foam slabs, sides of foam strips connected to the top and bottom by a suitable cement to form a hollow box, and a plurality of separate elongated foam bodying members arranged within the hollow box in general checkerboard fashion with each bodying member being connected at its ends with the top and the bottom.

It is, therefore, an object of the present invention to provide a fabricated resilient polyurethane foam cushion.

Further and additional objects will become apparent to those skilled in the art from the accompanying specification and drawing in which Fig. 1 is a side view with a sectional cutaway of a preferred embodiment of our fabricated cushion; Fig. 2 is a perspective view; and Fig. 3 is a perspective view of a partially completed cushion showing the general arrangement of the elongated bodying members.

Our fabricated cushion can be constructed of any suitable resilient polyurethane foam material, preferably having a density in the range between about 2 and 3 pounds per cubic foot. Resilient polyurethane foams as opposed to rigid polyurethane foams, can be prepared, generally, by mixing together linear polyester resins with a polyisocyanate, as for example, tolylene diisocyanate, in the presence of a small amount of water and a catalyst such as N-methyl morpholine. Although various formulations can be employed in the preparation of a resilient polyurethane foam, a preferred formula is as follows:

| | Parts by weight |
|---|---|
| Polyester resin [1] | 100.0 |
| Emulsifying agent [2] | 0.2 |
| Water | 2.4 |
| N-methyl morpholine | 1.2 |
| Diisocyanate monomer [3] | 33.0 |

[1] A preferred resin is known as Price Resin 3000 available from Price Varnish Co., Valley Park, Missouri.
[2] A preferred emulsifier is known in the trade as Emulphor ELA available from Akron Chemical Co., 255 Fountain St., Akron, Ohio.
[3] A preferred diisocyanate monomer is available from E. I. du Pont de Nemours under the trade name Hylene TM. This is a mixture of tolylene diisocyanate isomers.

Referring now to the drawing in detail, our fabricated polyurethane cushion, which can be any shape but which for purposes of illustration is shown as square, is comprised of a top 10 and bottom 11 which are preferably crowned. That is to say, they are thicker in their center portions than at their extremities. This can be seen from Figs. 1 and 2 of the drawing. The top and the bottom are connected by means of thin strips of foam shown as sides 12. These strips 12 are cemented to each other at their ends and to the top and the bottom on their sides, thus forming a hollow box. Any suitable adhesive such as a rubber cement can be employed for this purpose. However, a preferred adhesive is a solvent-type rubber cement available from Columbia Cement Co., 148 Ingraham St., Brooklyn 37, New York, under the trade name Columbia Cement PC-275. Within the hollow box are a plurality of elongated foam bodying members arranged in a general checkerboard fashion. These elongated bodying members are cemented at their ends to the top and the bottom but are not connected to each other. This checkerboard arrangement pertains over the entire space within the otherwise hollow portion of the cushion.

When the fabricated cushions are square or rectangular in their general shape, the elongated foam bodying agents are preferably oblong having a square cross-section. However, this is not necessary and small elongated cylinders of foam or other dimensional shapes can also be employed as the bodying members.

In fabricating our resilient polyurethane foam cushion, a base portion 11 is fitted with sides 12 and cemented with an adhesive as hereinbefore mentioned. Before the top portion 10 is applied, the bodying members 13 are cemented within the box portion in a general checkerboard arrangement. These bodying members are, in general, equal in length to the width of the side portions 12. After the entire box portion has been filled with the elongated bodying members, the top of each individual member and the side portions are coated with the adhesive and the top portion 10 applied. A weight is then applied over the entire area of the top in order to assure contact between it and the portions having the cement thereon. This weight is generally allowed to remain for a period of about 20 minutes or more.

Our fabricated cushion made of polyurethane foam has not only proved to be acceptably resilient and soft, but also to be extremely durable. A polyurethane foam cushion constructed in accordance with the present invention has withstood over 500,0000 consecutive compressions to 25% of original thickness without failure.

As mentioned hereinbefore, our cushion can be of any shape desired, and in this respect is very easy to fabricate. The top and bottom portions can have bevelled edges and/or can be cut in any desirable shape, since the sides readily adapt themselves to the edge of the top and bottom; that is, one long thin strip can be used to form the sides when the top and bottom portions are circular or oval in shape. Further, if desired, the top and bottom edges need not be flush with the sides but can be off-set. In all of these shapes, however, it is preferred to maintain the general checkerboard arrangement of the bodying members, although the shape of the bodying members can be varied to suit the situation. It is a significant feature of our cushion that the individual bodying members are not connected to each other, and hence can act individually without the inherent firmness of a solid piece merely having holes therein.

Although our cushion has been described and exemplified in terms of a preferred modification, those skilled in the art will appreciate that changes can be made without departing from the spirit and scope of the invention.

We claim:

1. A fabricated cushion made of resilient polyurethane foam comprising a bottom and top of thin polyurethane foam slabs; sides of polyurethane foam strips connected to said top and bottom to form a hollow box; and a plurality of elongated solid polyurethane foam bodying members arranged within said hollow box in general checkerboard fashion, each connected at its ends with said top and bottom.

2. A cushion according to claim 1 wherein said top and bottom are thicker in their centers than at their extremities.

3. A cushion according to claim 1 wherein said elongated bodying members have a square cross-section.

4. A fabricated cushion made of resilient polyurethane foam having a density in the range between 2 and 3 pounds per cubic foot comprising a bottom and top of thin polyurethane foam slabs; sides of polyurethane foam strips connected to said top and bottom to form a hollow box; and a plurality of elongated solid polyurethane foam bodying members arranged within said hollow box in general checkerboard fashion, each connected at its ends with said top and bottom.

References Cited in the file of this patent

UNITED STATES PATENTS

| | | |
|---|---|---|
| 1,296,359 | Brown | Mar. 4, 1919 |
| 2,588,823 | Glassman | Mar. 11, 1952 |
| 2,785,739 | McGregor et al. | Mar. 19, 1957 |

FOREIGN PATENTS

| | | |
|---|---|---|
| 709,641 | France | May 20, 1931 |
| 782,886 | France | Mar. 25, 1935 |